United States Patent [19]
Sanmugam

[11] Patent Number: 5,533,094
[45] Date of Patent: Jul. 2, 1996

[54] ALLOCATION OF PAGING CAPACITY IN CELLULAR APPLICATIONS BY STORING A SET OF PAGE REQUEST GROUP DESIGNATIONS, PAGING EXTENTS AND PAGING PRIORITY PARAMETERS

[75] Inventor: K. Raj Sanmugam, Montreal, Canada

[73] Assignee: Telefonaktiebolaget L M Ericsson, A Corp. of Sweden, Stockholm, Sweden

[21] Appl. No.: 881,598

[22] Filed: May 12, 1992

[51] Int. Cl.⁶ ..................................... H04Q 7/38
[52] U.S. Cl. ................. 379/57; 379/58; 379/59; 379/60; 340/825.44; 455/33.1
[58] Field of Search ................ 340/825.03, 825.44, 340/825.47; 379/56, 57, 58, 59, 60; 455/33.1, 33.2

[56] References Cited

U.S. PATENT DOCUMENTS

| 4,775,999 | 10/1988 | Williams | 379/59 |
| 4,833,701 | 5/1989 | Comroe et al. | 379/60 |
| 4,876,738 | 10/1989 | Selby | 455/33 |
| 4,959,648 | 9/1990 | Breeden et al. | 340/825.44 |
| 4,977,589 | 12/1990 | Johnson et al. | 379/58 |
| 5,058,200 | 10/1991 | Huang et al. | 455/33.1 |
| 5,115,233 | 5/1992 | Zdunek et al. | 340/825.44 |
| 5,146,214 | 9/1992 | Vamada et al. | 340/825.03 |
| 5,153,902 | 10/1992 | Buhl et al. | 379/57 |
| 5,235,633 | 8/1993 | Dennison et al. | 379/60 |
| 5,247,698 | 9/1993 | Sawyer et al. | 455/33.1 |
| 5,305,466 | 4/1994 | Taketsugu | 455/33.1 |
| 5,307,399 | 4/1994 | Dai et al. | 379/57 |
| 5,315,635 | 5/1994 | Kane et al. | 379/57 |
| 5,317,621 | 5/1994 | Shibayama | 379/57 |

FOREIGN PATENT DOCUMENTS

| 3921637 | 1/1991 | Germany | 379/59 |
| 2193861 | 2/1988 | United Kingdom. | |

OTHER PUBLICATIONS

Holley, "The GSM Short Message Service", IEE Colloquium on GSM and PCN Enhanced Mobile Services, Jan. 30, 1991.

Primary Examiner—Curtis Kuntz
Assistant Examiner—William Cumming
Attorney, Agent, or Firm—Jenkens & Gilchrist

[57] ABSTRACT

A method of and system for paging mobile stations within a cellular telecommunication system wherein the allocation of control channel paging capacity is optimized. Each page request for a mobile station received by the system is classified into a predesignated group based upon the characteristics of the request, such as the degree of certainty with which the location of the mobile is known and the origin of the page request. In accordance with the predesignated group to which the page request is assigned, each page request is assigned a paging extent designation to be associated with one or more page attempts and representing the geographic area within the system to which each page attempt is to be broadcast. A paging priority is then assigned to each page attempt based upon the previously assigned group characteristics and paging patterns. Each page attempt is executed within the system according to its designated priority.

21 Claims, 9 Drawing Sheets

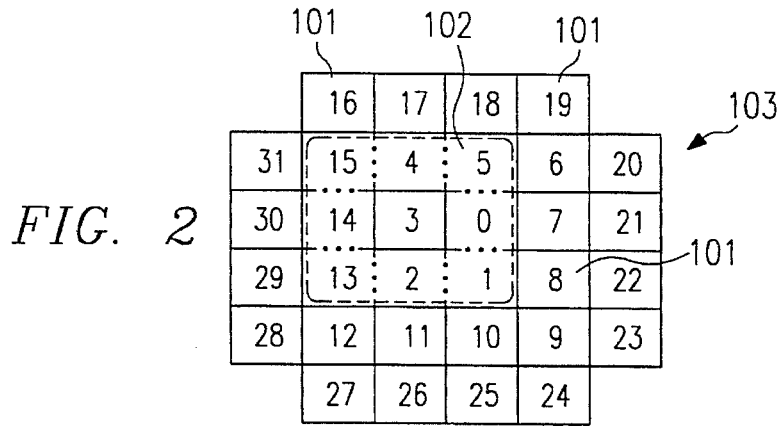
FIG. 2
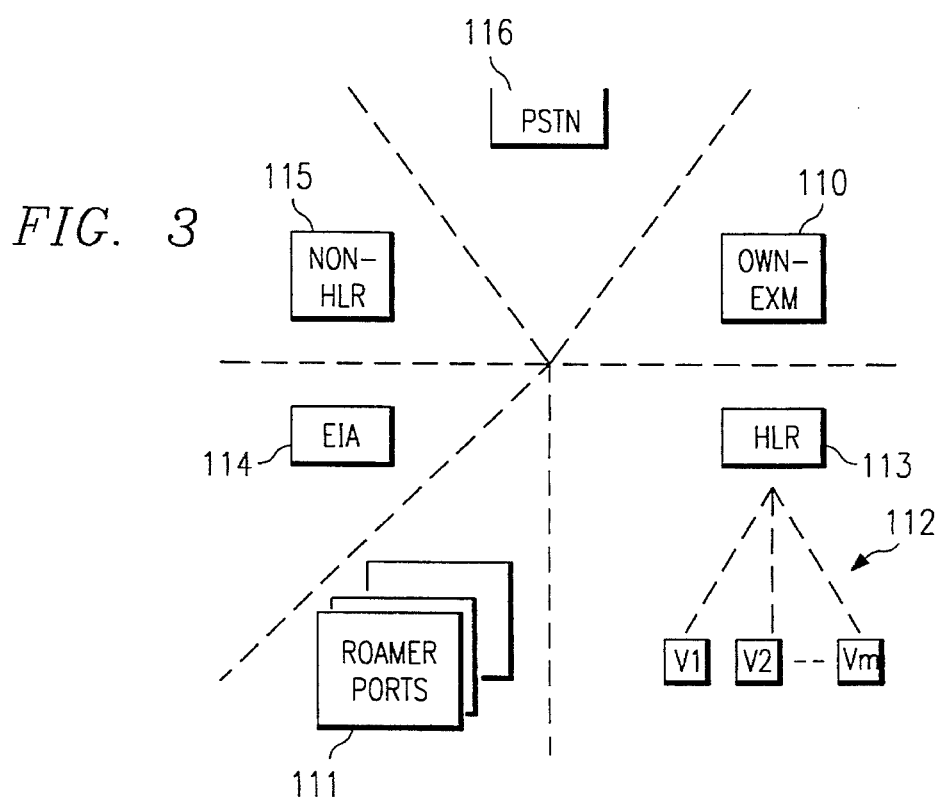
FIG. 3
FIG. 4
| GROUPS OF PAGE REQUESTS | |
|---|---|
| PRG | CHARACTERISTICS |
| 0 | LA IS KNOWN, MOST PROBABLE LOCATION. |
| 1 | LA IS UNKNOWN, MOST PROBABLE LOCATION. |
| 2 | LA IS KNOWN, ALTERNATIVE LOCATION. |
| 3 | LA IS UNKNOWN, ALTERNATIVE LOCATION. |

FIG. 5

| POSSIBLE PAGING EXTENTS | | | |
|---|---|---|---|
| PAGING EXTENT (PE) | PAGING FIELDS | | |
| | 1ST | 2ND | 3RD |
| 0 | (NULL) | | |
| 1 | LA | – | – |
| 2 | LA | LA | – |
| 3 | LA | LA | PA |
| 4 | LA | LA | SA |
| 5 | LA | PA | – |
| 6 | LA | SA | – |
| 7 | LA | SA | PA |
| 8 | PA | – | – |
| 9 | SA | PA | – |
| 10 | SA | – | – |
| 11 | SA | SA | – |

FIG. 6

| PAGING PARAMETER ASSOCIATIONS | | | | | |
|---|---|---|---|---|---|
| COOP. EXCHANGE | PRG | PE | PAGING PRIORITY | | |
| | | | 1ST | 2ND | 3RD |
| CHICAGO 1 | 0 | 3 | 4 | 5 | 5 |
| | 1 | 11 | 3 | 0 | – |
| | 2 | 4 | 7 | 7 | 1 |
| | 3 | 10 | 4 | – | – |
| TORONTO 2 | 0 | 4 | 6 | 6 | 3 |
| | 1 | 10 | 2 | – | – |
| | 2 | 7 | 7 | 3 | 6 |
| | 3 | 11 | 5 | 2 | – |
| VANCOUV 3 | 0 | 4 | 7 | 7 | 7 |
| ⋮ | ⋮ | ⋮ | ⋮ | ⋮ | ⋮ |

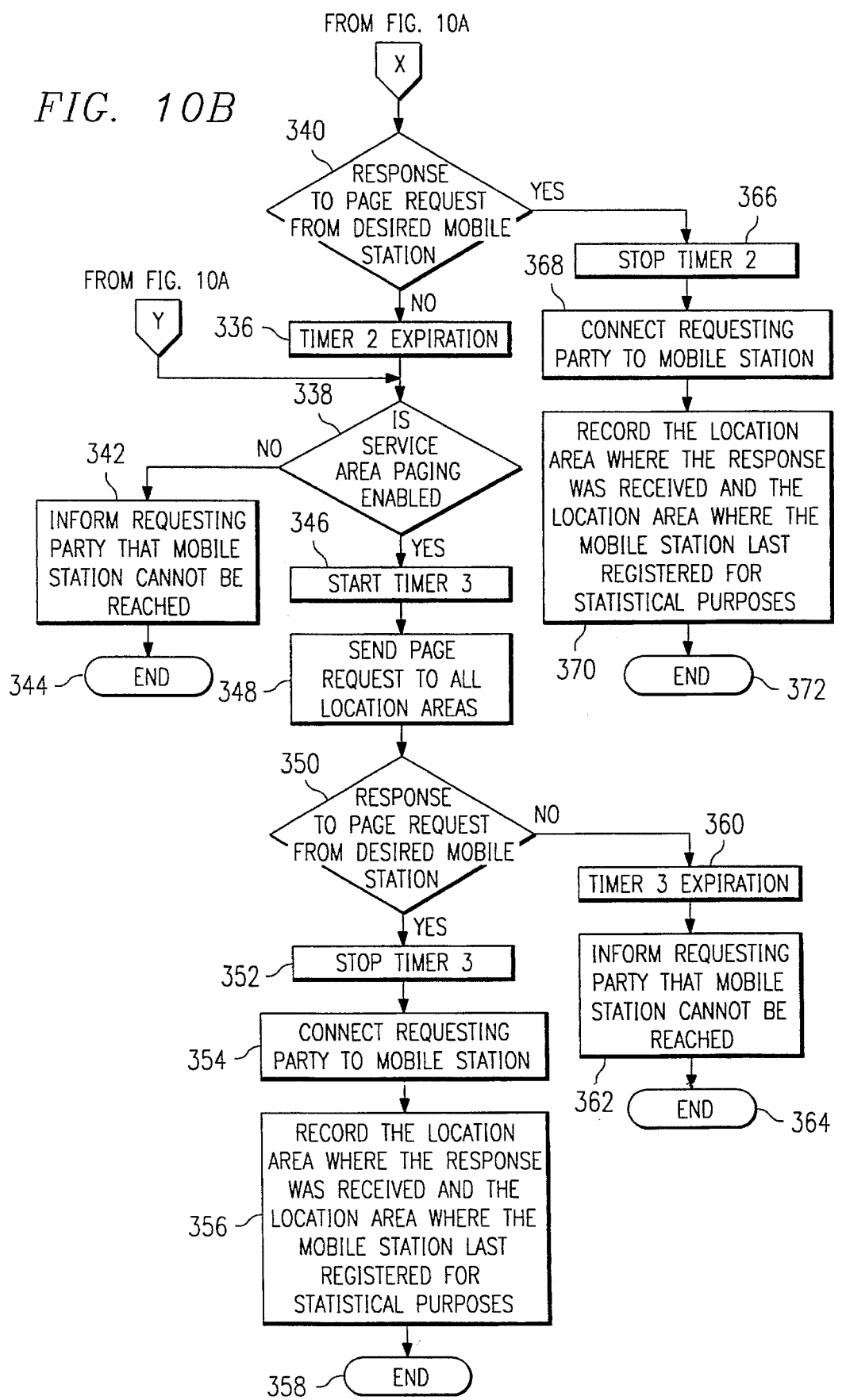

ALLOCATION OF PAGING CAPACITY IN CELLULAR APPLICATIONS BY STORING A SET OF PAGE REQUEST GROUP DESIGNATIONS, PAGING EXTENTS AND PAGING PRIORITY PARAMETERS

CROSS REFERENCE TO RELATED APPLICATION

This application contains subject matter related to copending U.S. patent application Ser. No. 07/882,607, filed May 12, 1992, in the names of Alain Boudreau et al., entitled "Cellular Communications System Utilizing Paging Areas," assigned to the assignee of the present invention and hereby incorporated by reference herein.

BACKGROUND OF THE INVENTION

1. Field Of The Invention

The present invention relates to paging within cellular communication systems, and more particularly, to optimizing the allocation of CONTROL CHANNEL paging capacity in a cellular communication system.

2. History of the Prior Art

Cellular radio communications is, perhaps, the fastest growing field in the world-wide telecommunications industry. Its growth has been such that in recent years the capacity of existing systems has been severely stressed to serve all of the subscribers who would like to have access to the system, particularly in major metropolitan areas. Moreover, cellular radio technology is currently moving from analog based systems, in which each subscriber communications channel is allotted to a single radio channel, to digital based systems in which a plurality of subscriber channels can be assigned to each radio channel through time division multiple access (TDMA) radio technology. In TDMA radio each channel is divided into a plurality of time slots and a digitized portion of each subscriber channel is broadcast in a different time slot.

However, despite the use of digital technology, such as TDMA, to increase cellular radio system capacity, the tremendous demand for cellular radio service is placing other demands on the system. For example, communication between the radio base stations within the system and the mobile stations within the system are divided into a plurality of voice or speech channels and at least one access or control channel, which may be either analog or digital and which may have any data rate. An illustrative one of such access or control channels is referred to as the forward control channel (FOCC).

Each mobile station which is operating within a cellular communications system must be locatable when a call is received by the system which is intended for that station. A mobile station is located by broadcasting a paging signal directed to the mobile and requesting it to respond if it receives the page. When the mobile broadcasts its page response signal to the page signal it is then placed on a voice channel by the base station and the call intended for the mobile can be connected to it through that voice channel. Cellular telecommunications systems employ a control channel such as the forward control channel (FOCC) as the means by which paging signals are broadcast into the various cells of the system in order to locate a particular mobile station. Thus, the more paging within a system the more radio traffic there is on the FOCC of the system. The continued subscriber growth within cellular systems along with the continued introduction of additional functionalities within the system will undoubtedly greatly increase the paging load within each system and place an even higher demand for FOCC capacity within each system.

The capacity of the control channel, such as the FOCC, within a system may be limited because of at least two reasons. For example, the data rate over certain forward control channels is restricted to a rate on the order of 8–10K bits per second which is a speed limitation imposed by the technology used in that implementation. Secondly, the control channel must also be utilized to transmit other messages to the mobile stations, including, for example, voice channel designations, directed retry orders, system ordered rescan signals and system overhead message trains each of which use substantial control channel capacity each time they are transmitted. Thus, there is a requirement to utilize the control channel capacity in as an efficient manner as possible in order to spread its limited capacity across as many functions as possible and enable the service of as many subscribers as possible with the defined resources.

In conventional cellular radio systems, the paging process within each system is employed to serve not only its own paging needs but also the paging needs of the various cooperating exchanges which seek to locate mobile subscribers within the exchange in response to call requests within their own exchanges. The paging process provides the service of attempting to locate a mobile station's whereabouts within the exchange in order to set up a call to that mobile station.

More specifically, the paging process in mobile cellular radio systems attempts to identify the specific cell containing that mobile, as described above in connection with the paging process. During the execution of this process, the mobile switching center (MSC) searches for the mobile by sending a sequence of paging messages on the control channel of the system and awaits a page response. Obviously, the page message must be transmitted to all of the cell sites covering the entire service area of the system in order to ensure that the mobile is located regardless of where it might be within the system. This implies, from a processing point of view, that when the use of paging capacity on all the control channels in the exchange is required, only one mobile can be paged at any given time. This limitation on cellular system capacity has been improved by the definition of "location areas" (LA's) wherein the entire service area of an exchange is divided into a plurality of different location areas. Each LA may consist of one or more individual cells within the system. Each mobile informs the system as to its specific LA identification either periodically or whenever it crosses a location area border by means of registration access within the system. The definition of LA's allows selective paging within the system thereby conserving paging capacity resources. That is, if the LA of a mobile station to be located is known then a page message for that mobile is sent only within that particular LA. As a result of this modification of the paging process, several different mobiles, as many as there are location areas, may be paged simultaneously within the system which greatly increases the paging capacity of the system.

When a page remains unanswered by the mobile station which is sought, the page must be repeated. This repetition can be either within a location area previously paged or within an area surrounding or associated with the location area, referred to as a paging area (PA), or within the entire service area (SA) of the system.

The present practice within cellular radio systems is to employ the paging process to handle incoming page requests on a "first come, first served" basis. Depending upon whether the location area (LA) of the requested mobile station is known or not, the amount of paging capacity allocated to serve a particular page request is the same. That is, if the LA of the mobile station is known then the first page attempt is within the LA. Otherwise, it is within the service area SA which includes all of the LA's within the exchange. If no response is received to the page, the page is repeated either within the LA itself or within the SA.

In present systems, when the control channel paging capacity is allocated in response to a page request, no consideration is given to the origin of the page request or to the subscriber characteristics or to the degree of certainty that the subscriber is believed to be in a particular location. The practice results in a substantial waste of the valuable control channel paging capacity. The system of the present invention enables optimization of the allocation of FOCC capacity within a cellular radio system.

SUMMARY OF THE INVENTION

In one aspect of the invention, the paging capacity of the control channel of a cellular radio system is allocated in response to the location from which the paging request originated, the priority of service of the mobile subscriber being paged, and the certainty of which the location of the subscriber is known in order to optimize the use of that capacity.

In another aspect of the invention, mobile stations within a cellular telecommunication system are paged by assigning to each page request received by the system a page request group designation based upon the characteristics of the page request which may include, for example, the degree of certainty with which the location of the mobile station is known, whether the location area of the mobile sought after is known or unknown, etc. Each of the received page requests is assigned a paging extent designation to be associated with one or more page attempts and representing the geographic area within the system to which each page attempt is to be broadcast. Each page attempt is also assigned a paging priority which may be related, for example, to the page request group, paging extent based, and the origin or source of the page request. Each page attempt is then executed within the telecommunication system in a sequential order based upon its assigned paging priority. In addition, each of the page attempts may be stored within a buffer memory in a sequential order in accordance with the paging priority assigned to each of the attempts.

In yet another aspect of the invention, a set of page request group designations, paging extents and paging priorities are selectively pre-assigned to each of a plurality of cooperating exchanges from which the system expects to receive page requests. The system retrieves these pre-assigned paging parameters when a page request is identified as having been received from a particular cooperating exchange.

Additionally, a set of default cooperating exchange page request group designations, paging extents and paging priorities are stored. These default paging parameters are retrieved in response to a page request wherein the identity of a cooperating exchange cannot be determined. Further, the paging priorities assigned to each page attempt are modified as a function of the priority of service of the mobile station to which the page request is directed. For example, the paging priorities of each page attempt directed to a mobile station which subscribes to priority service could be increased. The execution of page attempts in association with a particular page request is terminated when a page response is received from the mobile station being paged or after a pre-determined period of time has elapsed.

In another aspect of the invention, mobile stations within a cellular telecommunication system are paged by defining the amount of paging capacity to be utilized to execute an incoming page request, prioritizing the page attempts associated with each page request and then executing the page attempts based upon the paging priorities assigned to each page attempt. Paging capacities are assigned to the incoming page requests based upon the degree of certainty with which the location of the mobile station to which the page is directed is known, the relative cost of executing each of the page attempts within the system and the origin of the page request.

BRIEF DESCRIPTION OF THE DRAWINGS

For a more complete understanding of the present invention for further objects and advantages thereof, reference may now be had to the following description taken in conjunction with the accompanying drawings, in which:

FIG. 2 is a block diagram illustrating the organization of an exemplary cellular radio service area partitioned into location areas, paging areas, and service areas;

FIG. 3 is a block diagram illustrating possible sources of page requests within a cellular radio system;

FIG. 4 is a table listing various possible groups of page requests received by a cellular radio system;

FIG. 5 is a table listing possible paging extents within a cellular radio system;

FIG. 6 is a table listing exemplary paging parameter associations within the cellular radio system;

FIG. 10A–10B is a flow chart illustrating the manner in which paging requests are handled, including the ultilization of paging areas in accordance with the system of the present invention.

DETAILED DESCRIPTION OF THE PREFERRED EMBODIMENTS

Figure 1:
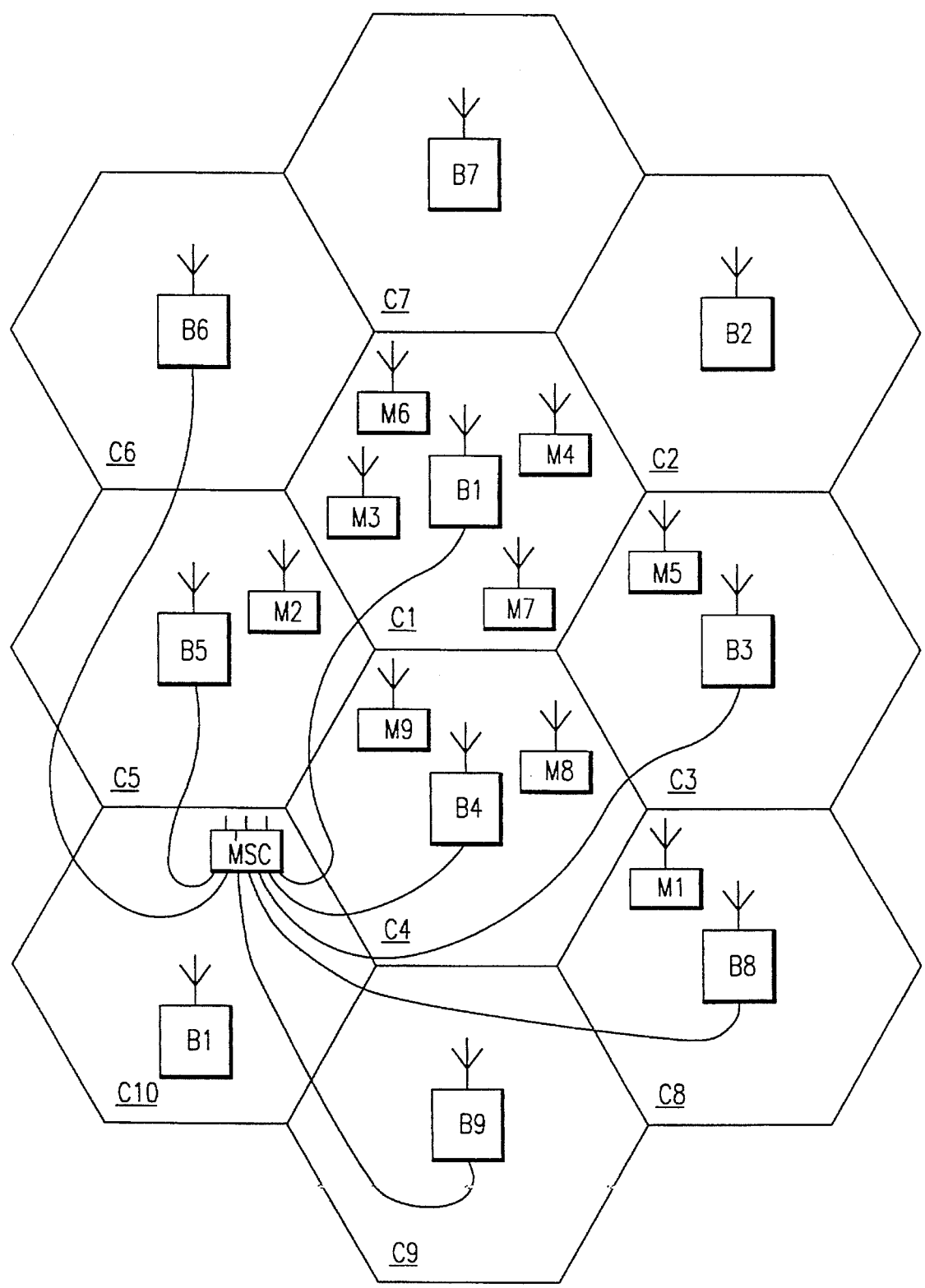
FIG. 1 is a pictorial representation of a cellular radio communication system including a mobile switching center, a plurality of base stations, and a plurality of mobile stations.

Referring first to FIG. 1, there is illustrated a conventional cellular radio communications system of the type to which the present invention generally pertains. In FIG. 1, an arbitrary geographic area may be divided into a plurality of contiguous radio coverage areas, or cells C1–C10. While the system of FIG. 1 is illustratively shown to include only 10 cells, it should be clearly understood that in practice, the number of cells will be much larger.

Associated with and located within each of the cells C1–C10 is a base station designated as a corresponding one of a plurality of base stations B1–B10. Each of the base stations B1–B10 includes a transmitter, a receiver, and base station controller as are well known in the art. In FIG. 1, the base stations B1–B10 are illustratively located at the center of each of the cells C1–C10, respectively, and are equipped with omni-directional antennas. However, in other configurations of a cellular radio system, the base stations B1–B10 may be located near the periphery, or otherwise away from the centers of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of the cellular radio system within which the system of the present invention is implemented.

With continuing reference to FIG. 1, a plurality of mobile stations M1–M10 may be found within the cells C1–C10. Again, only 10 mobile stations are shown in FIG. 1 but it should be understood that the actual number of mobile stations will be much larger in practice and will invariably greatly exceed the number of base stations. Moreover, while none of the mobile stations M1–M10 may be found in some of the cells C1–C10, the presence or absence of the mobile stations M1–M10 in any particular one of the cells C1–C10 should be understood to depend, in practice on the individual desires of the mobile stations M1–M10 who may roam from one location in the cell to another or from one cell to an adjacent cell or neighboring cell, and even from one cellular radio system served by an MSC to another such system.

Each of the mobile stations M1–M10 is capable of initiating or receiving a telephone call through one or more of the base stations B1–B10 and a mobile switching center MSC. A mobile switching center MSC is connected by communication links, e.g., cables, to each of the illustrative base stations B1–B10 and to the fixed public switched telephone network PSTN, not shown, or a similar fixed network which may include an integrated system digital network (ISDN) facility. The relevant connections between the mobile switching center MSC and the base stations B1–B10, or between the mobile switching center MSC and the PSTN or ISDN, are not completely shown in FIG. 1 but are well known to those of ordinary skill in the art. Similarly, it is also known to include more than one mobile switching center in a cellular radio system and to connect each additional mobile switching center to a different group of base stations and to other mobile switching centers via cable or radio links.

Each of the cells C1–C10 is allocated a plurality of voice or speech channels and at least one access or control channel, such as a forward control channel (FOCC). The control channel is used to control or supervise the operation of mobile stations by means of information transmitted to and received from those units. Such information may include incoming call signals, outgoing call signals, page signals, page response signals, location registration signals, voice channel assignments, maintenance instructions, and "handoff" instructions as a mobile station travels out of the radio coverage of one cell and into the radio coverage of another cell. The control or voice channels may operate either in an analog or digital mode or a combination thereof.

Referring next to FIG. 2, there is shown a block diagram of an illustrative cellular radio system served by a particular MSC in which the cells, illustrated in FIG. 1, are organized into groupings to enable the more efficient utilization of the system resources. In FIG. 2, there are defined a plurality of location areas 101, illustratively shown as being thirty-two in number and numbered 0–31. Each location area (LA) 101 may include one or more individual cells. In addition, each location area 101 is surrounded by an additional grouping of location areas which together comprise a paging area (PA) 102. For example, the paging area 102 surrounding location area "3" includes location areas 1, 2, 3, 13, 14, 15, 4, 5 and 0. Finally, all of the location areas 101 taken together comprise the service area (SA) 103 of the system. The grouping of location areas into paging areas and the use thereof in enhancing paging efficiency in a cellular communication system may be as set forth in copending U.S. patent application Ser. No. 07/882,607, filed May 12, 1992 in the names of Alain Boudreau et al. entitled "Cellular Communications System Utilizing Paging Areas," assigned to the assignee of the present invention and incorporated by reference herein.

As shown in FIG. 2, the entire service area SA 103 is divided into many different location areas LAs 101, for example, the thirty-two as illustratively shown in the figure. Each mobile station informs the system of its current LA identification number by broadcasting that identification number either periodically or whenever the mobile crosses a location area border and is caused to do so by known registration access processes. The definition of the location areas 101 allows selective paging within the system. That is, if the location area of a particular mobile station desired to be located is known then the paging message is only sent within that particular location area. Thus, as many as thirty-two mobile stations may be paged simultaneously within the service area 103, illustratively shown in FIG. 2.

An unanswered page is generally repeated. However, this repetition can be repeated within either the location area already paged, within the area surrounding the location area 101, i.e. the paging area 102, or within the entire service area 103. FIG. 2 illustrates the composition of the various paging fields comprising the location areas 101, paging area 102, and service area 103. For example, if initial paging is performed within location area "3" and no response is obtained, the next page could be broadcast within the paging area 102 surrounding location area "3", and if still no response is obtained from the mobile, the paging could be repeated within the entire service area 103, covering all of the location areas 0–31. If, however, no particular location area is known for the mobile which is desired to be located, the paging must be by definition within the entire service area 103 including all thirty-two of the location areas 0–31.

It could be observed from FIG. 2 that the breadth of the paging field, i.e., LA, PA, or SA, generally represents the extent of the control channel capacity required to broadcast the paging message to the mobile within that field. For example, broadcasting a page within the entire service area requires paging capacity from all of the base stations in the exchange, while paging within one paging area requires capacity from fewer base stations and so forth.

Referring next to FIG. 3, it can be seen that the request for paging service by an exchange can originate from various possible sources. For example, a page request may originate from within the same system 110 performing the paging operation. Additionally, paging may be requested in response to: calls initiated through roamer ports 111; calls originating from other cooperating exchanges or other networks 112 coupled through a home location register 113; calls originating from EIA exchanges or networks 114; calls from other non-home location register sources 115; and calls from the PSTN 116. It is very likely that a particular operator of a cellular system may wish to allocate a certain priority to the execution of a page request as a function of the source from which the page request was received. That is, an operator may find that an inordinate number of page requests are being received from a particular cooperating exchange with a correspondingly very small number of resultant page responses being received from mobiles in reply to those requests. This might indicate that that particular cooperating exchange is being less attentive to the issuance of accurate page requests thus making it economically desirable to limit the priority of the page requests received from such an exchange.

It is also understood that particular mobile subscribers may be allotted various classes of service. For example, certain subscribers, e.g., emergency vehicles, may wish to obtain the very highest priority in being located within the system in response to an incoming call. Such subscribers who are paying for an enhanced class of service with respect to priority of location should be accorded a high level of priority when page requests are being allocated for execution within the system.

It should be understood that the factors influencing paging extents or priorities may include others in addition to those listed above and the scope of the present invention is not limited to those specifically given herein as being exemplary.

Finally, there are varying levels of certainty within which the location of a mobile station may be known within a system. For example, a subscriber's location designation may be a recently verified location, e.g., as a result of a recent registration, in which case the mobile station is very likely to answer a page broadcast to that location. Such a location is referred to as the most probable location. Alternatively, the basis for a belief in the anticipated location of a mobile station may result from multiple registrations or from location updating of the mobile's position in which case the likelihood of getting the mobile's response to a page in the anticipated location is considerably less. Accordingly, the goal of optimizing the use of paging resources renders it desirable to allocate the execution of a page request to the most probable location of each of the desired mobiles within the system.

Overall, the system of the present invention overcomes numerous drawbacks inherent in the current technique of allocating paging capacity in accordance with a "first come, first served" basis. These drawbacks include:

(a) Page requests directed to known location areas are not treated fairly if the exchange is at the same time busy servicing requests with unknown location areas, that is, engaged in service area paging. Paging capacity should be allocated first to pages where the mobiles are most likely to respond to the page.

(b) If one cooperating communications network is generating too many page requests within the cellular system for which the mobile response rate is low, those actions will have repercussions on the response rate obtained from the page requests generated by the other networks since the available paging capacity to them is reduced. Failure to exert control over the amount of paging capacity allocated to various telecommunications networks which generate page requests within a cellular system results in inefficient operation of that system.

(c) Priority subscribers do not receive a fair service response since page requests directed to them receive no special priority over page requests directed to other subscribers. In addition, the paging capacity used to serve non-priority subscribers may also be utilized in vain since they can be denied a voice channel even after broadcast of a successful page response.

The system of the present invention optimizes page response rate while utilizing minimum capacity within the control channel of the system. This is accomplished by means of formulating an approach whereby the extent of the paging capacity of the system to be used by an incoming page request is defined and the relative importance of the various page attempts is expressed and implemented. Any incoming page requests are then allowed to use the preallocated paging capacity and the order in which the page requests receive paging service is assigned in accordance with their relative importance.

In conceptualizing the approach taken by the present exemplary embodiment of the present invention it is assumed that the degree of certainty with which a mobile is believed to be in a given location can be expressed as either the most probable location or an alternative location. One exemplary embodiment of the present system may include eight levels of paging priority with page attempts having a priority value of seven being the highest priority and page attempts with a priority value of zero the lowest. The paging priority of a subscriber is adjusted in accordance with the priority value assigned to the subscriber, i.e., their paging priority is either increased or decreased accordingly. In this exemplary embodiment, priority subscribers receive an increase in priority value of, for example, one priority value. The goal is to determine the paging extent and the priority for each page request. The first step in this procedure is to classify incoming page requests into groups as a function of the page request characteristics, for example, the certainty with which the location of the mobile is known. A possible list of page request groups classified in this way is shown in FIG. 4.

The allocation of paging capacity within the system of the invention is defined by means of "paging extents" which are used to identify the various paging fields available, i.e., LA, PA, or SA, that are to be associated with each paging attempt. Implicitly, such a system also defines the number of paging attempts to be performed by the system as illustrated for typically representative values in FIG. 5. For example, as shown in FIG. 5, paging extent #3 (LA, LA, PA) specifies that there are to be three successive page attempts with the first two attempts occurring within the given location area LA and the third one within the paging area PA. Whereas, in paging extent #9 (SA, PA) two attempts are specified with the entire service area SA being paged first and then the paging area PA being paged second.

It should also be noticed that the relative importance of the various paging attempts is expressed by means of a "weight" referred to as a "paging priority." The assignment of paging priorities to the various page requests is based upon several factors related to the economics of the cellular system. These factors include:

(a) the cost of the paging, e.g., location area paging is generally less expensive and may be given higher priority over service area paging;

(b) the number of previous page attempts, e.g., the third attempt may receive a higher priority over the second attempt and the second attempt over the first attempt, etc.;

(c) the origin of the page request, e.g., it may be preferable to handle requests from certain cooperating exchanges with lower priority, particularly when another operator is generating an excessive number of paging requests with a low degree of responses thereto; and (d) priority subscribers, i.e., a priority subscriber should be given a higher priority than non-priority subscribers.

Thus, for a given page request, the determination of the paging extents and the paging priorities within the system of the present invention is based upon the following criteria:

(a) subscriber characteristics;

(b) page request characteristics; and (c) the origin of the page request.

The system operator is enabled by the method and system of the present invention to control each of these separate parameters in accordance with the factors which he considers most important in his particular circumstances.

As discussed above, one embodiment of the system of the present invention assumes that the degree of certainty that a mobile station is believed to be in a given location is expressed as either the most probable location or an alternative location and that there are, for example, eight possible levels of paging priority to be accorded to the paging of a particular mobile. Page attempts with a priority value of 7 are to have the highest priority while page attempts with priority value of 0 are to have the lowest priority. In addition, the priority subscribers are to be given an increase in their paging priority value of 1.

In accordance with this embodiment of the system of the present invention the paging extent and the paging priority of a paging request are determined as follows:

First, an incoming paging request is classified into one of several groups depending upon the request characteristics. Such characteristics may include, for example, whether or not the location area (LA) of the mobile being sought is known and the degree of certainty with which the actual location of the mobile is known. It should be understood that these requested characteristics can be expanded and not limited to these two alone. FIG. 4 shows an illustrative possible list of groups, referred to as page request groups (PRG), and can be illustratively classified in four subgroups. PRG0 is one in which the location area of the mobile being sought is known and that this location is the most probable location. PRG1 is a classification in which the specific LA is unknown yet this area is believed to be the most probable location for the mobile. Similarly, PRG2 is one in which the location area is known, however, this is an alternative location at which the mobile may be found. Finally, PRG3 is one in which the location area is unknown and this is also an alternative location.

Next, within the system a set of possible paging extents representing the various paging costs within the cellular system is defined. Referring to FIG. 5, paging extents 0–11 are illustrated with paging extent 0 comprising no paging fields, paging extent 1 including only a first field comprising the location area; paging extent 2 includes two successive pages both of which are limited to the location area, and so forth with paging extent 11 being two successive pages in the entire system area.

Paging extents and paging priorities are then assigned to the various cooperating exchanges within the cellular system network depending upon the page request groups. FIG. 6 illustrates a table of assignments of possible paging parameter association values. For example, page requests originating from Chicago system 1 which fall under page request group 2 and receive a paging extent #4 (LA, LA, SA) are assigned paging priorities 7, 7 and 1, respectively for each paging attempt.

During the execution of the paging process the system of the present invention serves incoming page requests according to the priority value assigned to the particular paging parameters. By way of further illustration, if a page request originates from Chicago1 with a known LA, and the location is a most probable one, and the subscriber being searched for is a priority subscriber, the request will fall under PRG0. The paging process, therefore, will select paging extent #3 (LA, LA, PA) with paging priorities of 4, 5 and 5, respectively. In addition, since the subscriber is a priority-subscriber, each paging priority will be increased by 1 resulting in priorities 5, 6 and 6, respectively for each of the three page attempts. The first page attempt will wait for its paging service in an appropriate page request buffer according to the paging priority "5." When its turn for sending the page message comes, that message will be broadcast on the FOCC within the location area paging field. If a page response is not received within a predetermined time period, paging is repeated for the next page attempt, i.e., again within the location area, with a priority of 6, and so forth. In the meantime, if another request with similar characteristics arises from Toronto2, then the paging extent #4 (LA, LA, SA) would be selected with paging priorities 6, 6 and 3, which is then increased to 7, 7 and 4, respectively, because of the sought for subscriber with priority service. The page request is translated into page attempts and placed into buffers to be served in accordance with the assigned priority of each.

Implementation of the system of the present invention involves two phases, the definition of paging parameters by a system operator and the retrieval, dynamic alteration and application of related paging parameters during the paging process. The system may supply default values for all cooperating exchanges when this feature is introduced initially, or thereafter to those cooperating exchanges to which paging parameters have not be assigned.

First, the system operator is required to define certain fundamental parameters which best suit the particular network configuration within which the system is functioning. This includes four basic decisions:

1. Identification and definition of the required page request groups which is usually done with the help of the system designer.

2. Identification and definition of the possible paging fields which make up the paging extents, which is also usually done with the assistance of the system designer.

3. Assembly of a list of paging extents using the possible paging fields.

4. Determination of the paging priority strategy by analyzing the characteristics of the page request and the various paging extents. That is, a determination of the paging priority values that are to be associated with the related page attempts and an examination of how these values can be changed in order to serve the various cooperating exchanges.

Second, the system operator is required to assign paging parameters to the desired cooperating exchanges.

Finally, the system operator defines the default paging parameters for the "own exchange" conditions. That is, the parameters to be used whenever the cooperating exchange identity is not available, e.g., where calls originate/terminate in the same exchange.

During the paging process the assigned parameter values are automatically retrieved and applied by the system to optimize the utilization of the paging capacity of the control channel.

Figure 7:
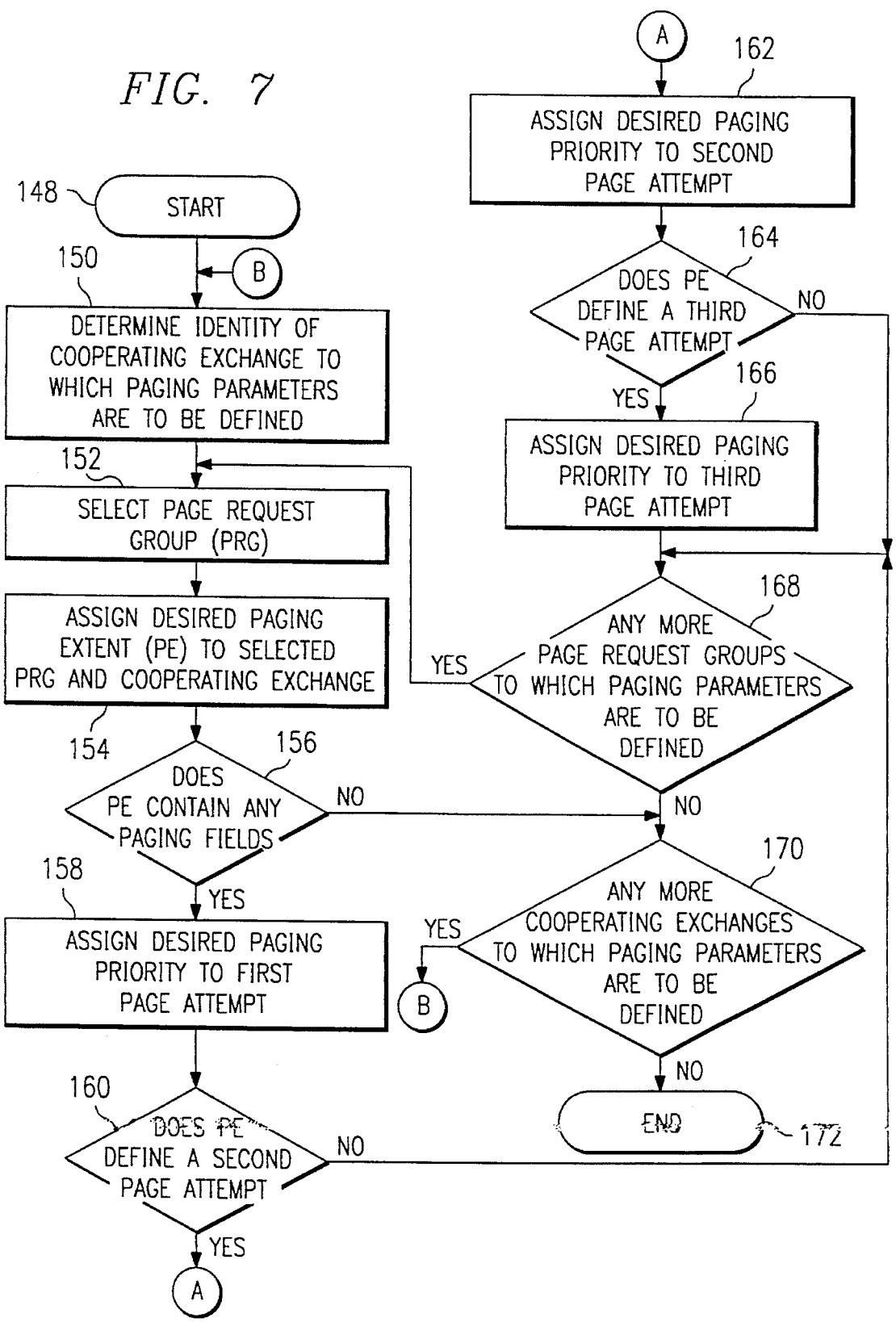
FIG. 7 is a flow chart illustrating the manner in which paging parameters are assigned corresponding to the identity of the originating cooperating exchange.

The flow chart of FIG. 7 illustrates how the system of the present invention implements the assignment of paging parameters to the various page requests based upon the various factors discussed above. The procedure begins at 148 and at 150 the identity of the cooperating exchange to which the paging parameters are to be defined is determined. Thereafter, at 152 a page request group (PRG) is selected, and at 154 a desired paging extent (PE) is assigned to the selected PRG for that particular cooperating exchange. At 156, the system asks whether the assigned paging extent contains any paging fields. If not, the system moves to 170 and asks whether there are any more cooperating exchanges to which paging parameters are to be defined. If not, the system moves to 172 and the procedure ends. If, however, there are additional cooperating exchanges to be processed, the system returns to 150 to implement the above procedure from the beginning for the next cooperating exchange to which paging parameters are to be assigned.

If at 156 the paging extent assigned to the selected PRG for the particular cooperating exchange being processed does contain paging fields, the system moves to 158 and assigns a selected paging priority to the first page attempt within the paging field of that particular paging extent. The procedure next moves to 160 and asks whether the assigned paging extent defines a second page attempt. If not, the system moves to 168 and asks whether there are any more page request groups to which paging parameters are to be defined and, if not, to 170 and asks whether there are any more cooperating exchanges to which paging parameters are to be defined and, if not, the procedure ends at 172. Again, if additional exchanges to be processed do exist, the procedure returns to 150 to begin the process anew for the next cooperating exchange. If, however, at 160 the paging extent is found to define a second page attempt, the procedure moves to 162 where a desired paging priority is assigned to the second page attempt. Thereafter, at 164 the procedure asks whether the paging extent defines a third page attempt and, if not, the procedure bypasses step 166 and proceeds to 168. If at 164 the paging extent does define a third page attempt, the procedure moves to 166 wherein a desired paging priority is assigned to the third page attempt.

At 168 the system asks whether or not there are any more page request groups to which paging parameters are to be defined. If so, the system returns to 152 to continue the procedure for the next page request group. If at 168, there are not any more page request groups to which paging parameters are to be defined, the system moves to 170 and asks whether any more cooperating exchanges exist to which paging parameters are to be defined. If yes, the system will return to 150 and, if not, the procedure ends at 172.

As can be seen, the procedure shown in the flow chart of FIG. 7 enables the operator of a cellular system containing the system of the present invention to initially select and define the paging parameters to be employed within the system. One set of parameters is defined for each cooperating exchange which is to interface with the operator's system.

Figure 8A:
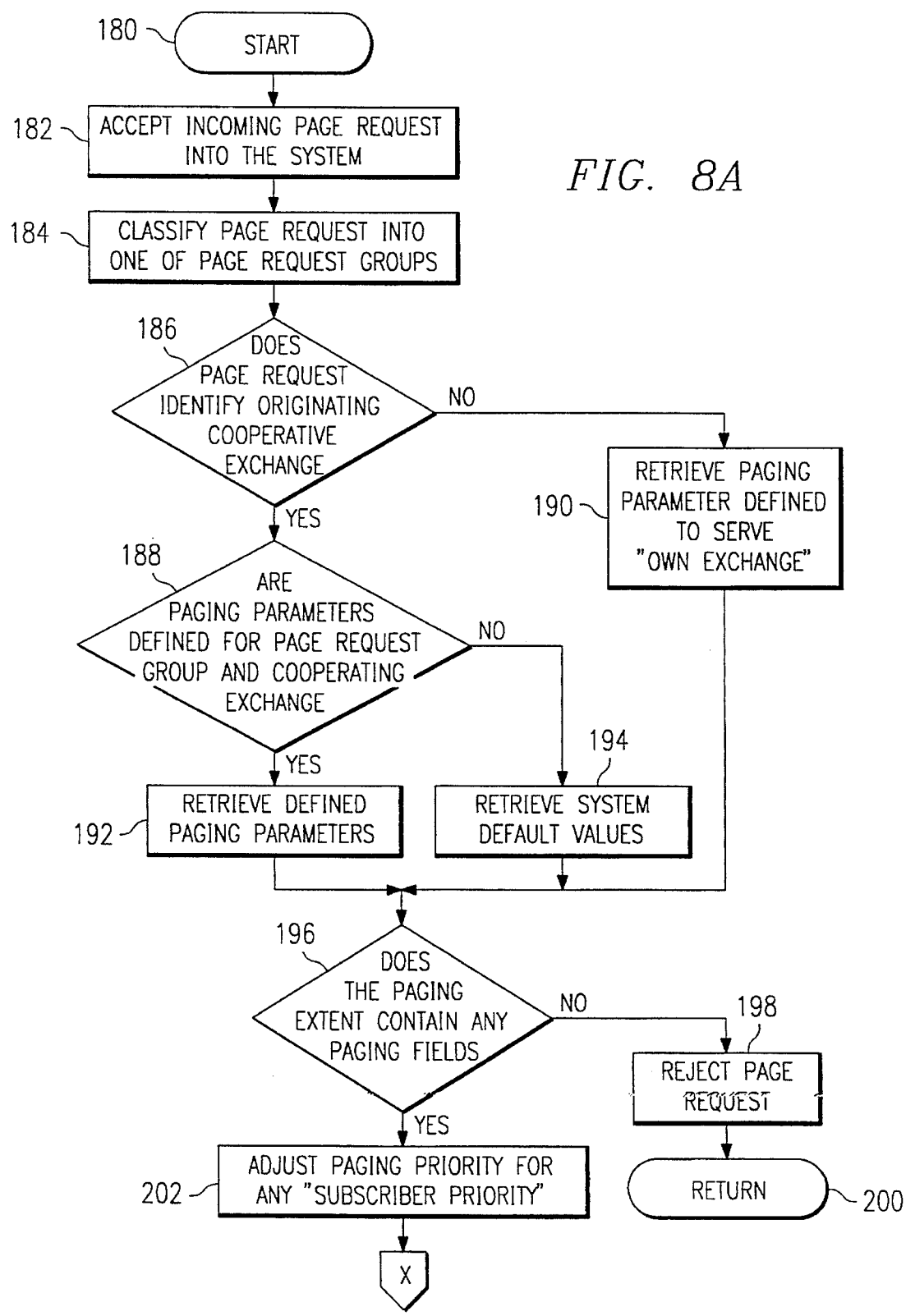
FIG. 8A–8B is a flow chart illustrating the manner in which designated paging parameters are applied to page requests coming into the system.
Figure 8B:
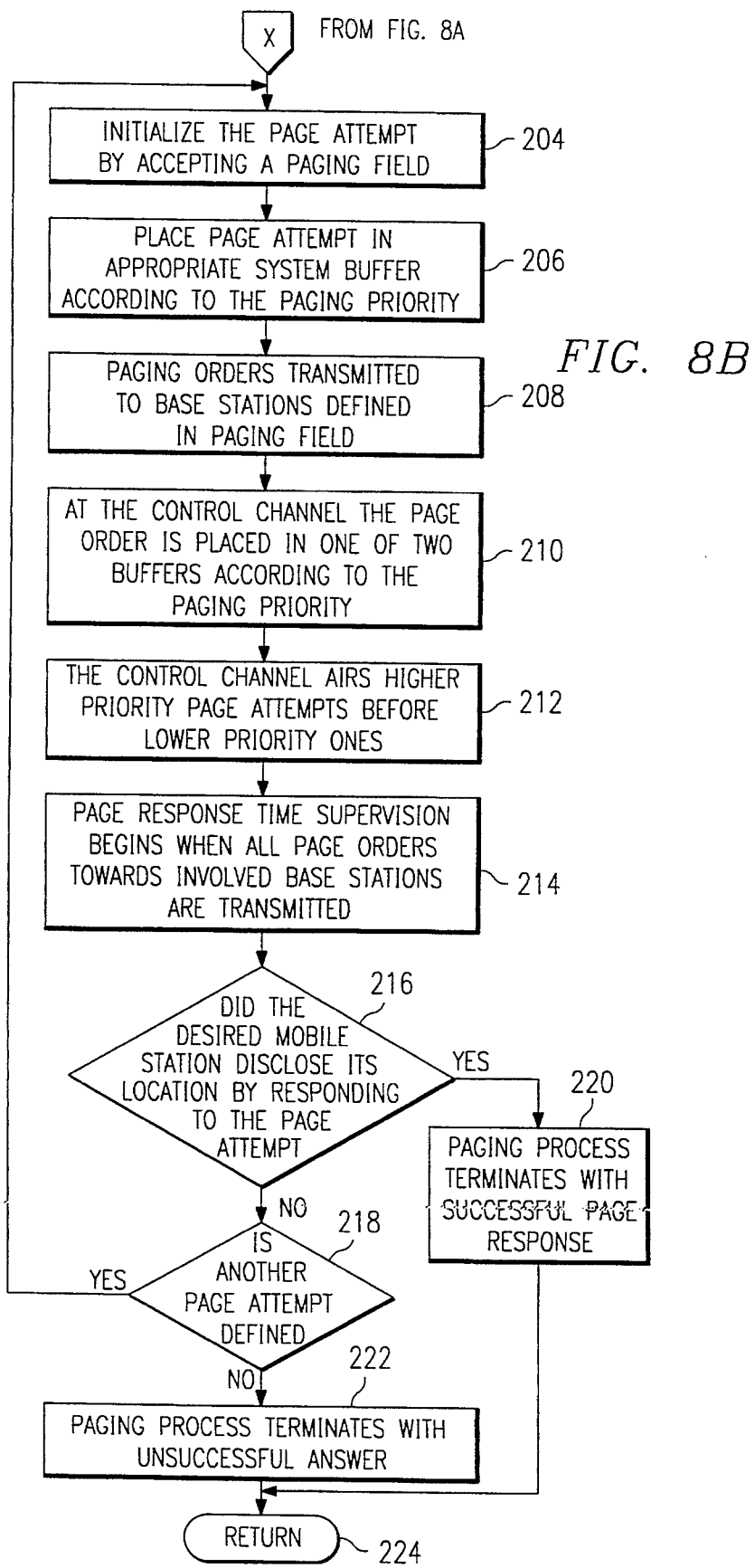

Referring next to the flow chart of FIG. 8A–8B, it is there illustrated how the system of the present invention applies the designated paging parameters selected and defined in accordance with the procedures of FIG. 7 to a page request coming into the system. The procedure begins at 180 and at 182 an incoming page request is accepted into the system. Thereafter, at 184 the accepted page request is classified into one of a plurality of page request groups based upon the characteristics of the page request. Next, at 186 the system asks whether the page request identifies from which cooperating exchange it originates. If yes, the system then asks at 188 whether there are any paging parameters already defined for this particular page request type and this particular cooperating exchange. If yes, at 192 the set of previously defined paging parameters are retrieved. If, however, the answer is no at 188, the system retrieves a set of default values instead. Thereafter, in both cases the system proceeds to 196. Referring back to the inquiry at 186, if the page request does not identify from which cooperating exchange it originates, the procedure proceeds to 190 where the paging parameters defined to serve the operator's "Own Exchange" are retrieved, and the system proceeds to 196 also. At 196, the system has established a set of paging parameters to be associated with the page request being processed, either those assigned to a cooperating exchange by the operator, cooperating exchange default values or values associated with page requests from the operator's own exchange. The system then asks whether the paging extent value within the paging parameters contains any paging fields. If not, the system proceeds to 198 to reject the page request, moves to 200 and returns to 180 to again begin the procedure for the next incoming page request.

If at 196, the paging extent does contain paging fields, the system proceeds to 202 where the system adjusts the paging priority if the system subscriber being s ought by the page request is a "priority subscriber." The system maintains a table containing the adjustment values by which a paging priority is to be adjusted (increased or decreased), for each of a plurality of assigned "subscriber priorities." Thereafter, the system moves to 204 where the page attempt is initialized by the acceptance of a paging field. At 206, the page attempt is placed in an appropriate system buffer according to the paging priority established for that page attempt. In this buffer, a page attempt awaits its turn to be broadcast within the system, i.e., for orders to air the paging message given to all of the base stations involved in the defined paging field. Higher priority page attempts contained within the system buffer are serviced before lower priority page attempts.

At 208, paging orders are transmitted towards the base stations carrying the associated paging priorities. Thereafter, at 210, and at the control channel within the base station, the page message is placed in one of two buffers, either "Stream A" or "Stream B," according to the paging priority. The particular buffer is selected depending on the least significant bit of the identification number (even or odd) of the mobile stations being paged. Next, at 212, the control channel selects from the Stream A/Stream B buffers the higher priority page messages before the lower priority page messages and broadcasts the page message for the sought after mobile into the system. At 214, the page response time supervision is begun at the MSC when the page order towards all involved base stations is given. The page attempt is then considered to be in a "waiting for page response" state. The system proceeds to 216 where it asks during the "waiting for page response" state whether the desired mobile station has disclosed its location by responding to the page. If yes, the system moves to 220 where the paging process terminates with the receipt of a successful page response. The system then moves to 224 where it returns to 180 to restart the procedure for the next incoming page request. If, however, at 216 the desired mobile station does not disclose its location by responding to the page attempt, the system asks at 218 whether another page attempt has been defined. If yes, the system returns to 204 to initialize this second page attempt. If at 218 another page attempt is not defined, the procedure moves to 222 where the paging process terminates without success and, at 224 the system returns to 180 to restart the procedure for the next incoming page request.

As illustrated in FIG. 8, the system of the present invention utilizes the various paging parameters which have been assigned by associating selected ones of them with each page request. This provides a priority to each page attempt which is used to allocate system paging facilities, such as FOCC, in accordance with the goal of optimizing the use of those facilities.

Figure 9:
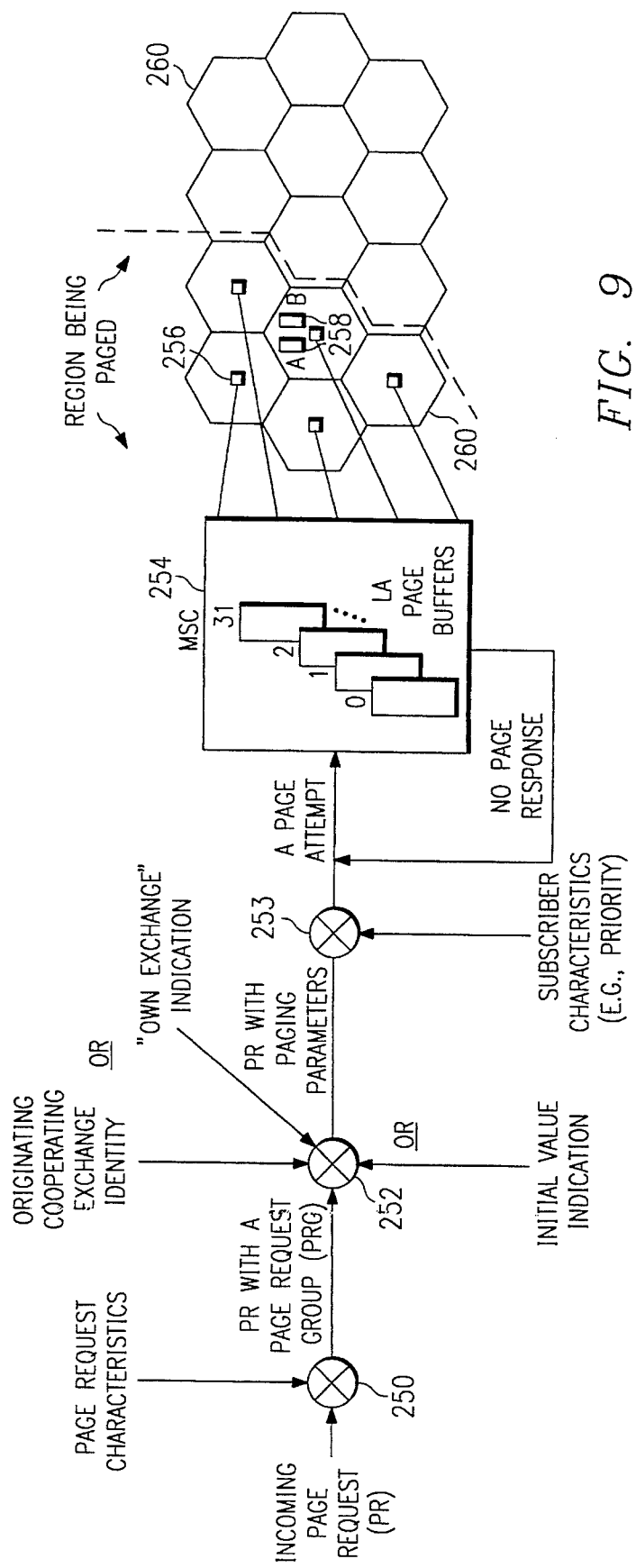
FIG. 9 is a diagram illustrating the handling of page requests in accordance with the system of the present invention.

Referring now to FIG. 9, there is shown an overall illustrative diagram depicting the handling of page requests by the system in the present invention. At node 250, the system accepts an incoming page request along with its particular characteristics and determines the designation of a page request group. The page request, along with its associated page request group designation, proceeds to node 252 at which the system determines whether the identity of the cooperating exchange from which the page request originated is available. If not, the system will retrieve the paging parameters defined to serve the "Own Exchange." If the identity of the cooperating exchange is available, the system will either retrieve the paging parameters defined for that particular originating cooperating exchange or retrieve preselected default values supplied by the system if paging parameters have not been defined for that particular cooperating exchange. The page request and its associated paging parameters proceeds to node 253 where the paging parameters are combined with the subscriber characteristics, such as subscriber priority, and becomes a page attempt which is transmitted to the MSC 254 and placed in the paging buffers associated with the appropriate location areas. There is one buffer for each location area. The MSC 254 then transmits the page attempt from each of the appropriate buffers to their associated location areas 260 within the region being paged. These page attempts are sent to each base station 256 within each location area 260. At each control channel, there are two buffers 258, stream A and stream B, which are utilized to place the page attempts into the control channel (FOCC) for broadcast according to the assigned page attempt priorities. The MSC 254 enters and remains in a state of waiting for a page response from the time a page order is sent to the base stations. If no page response is received within a designated time period the MSC 254 will reset itself and await new page attempts.

Figure 10A:
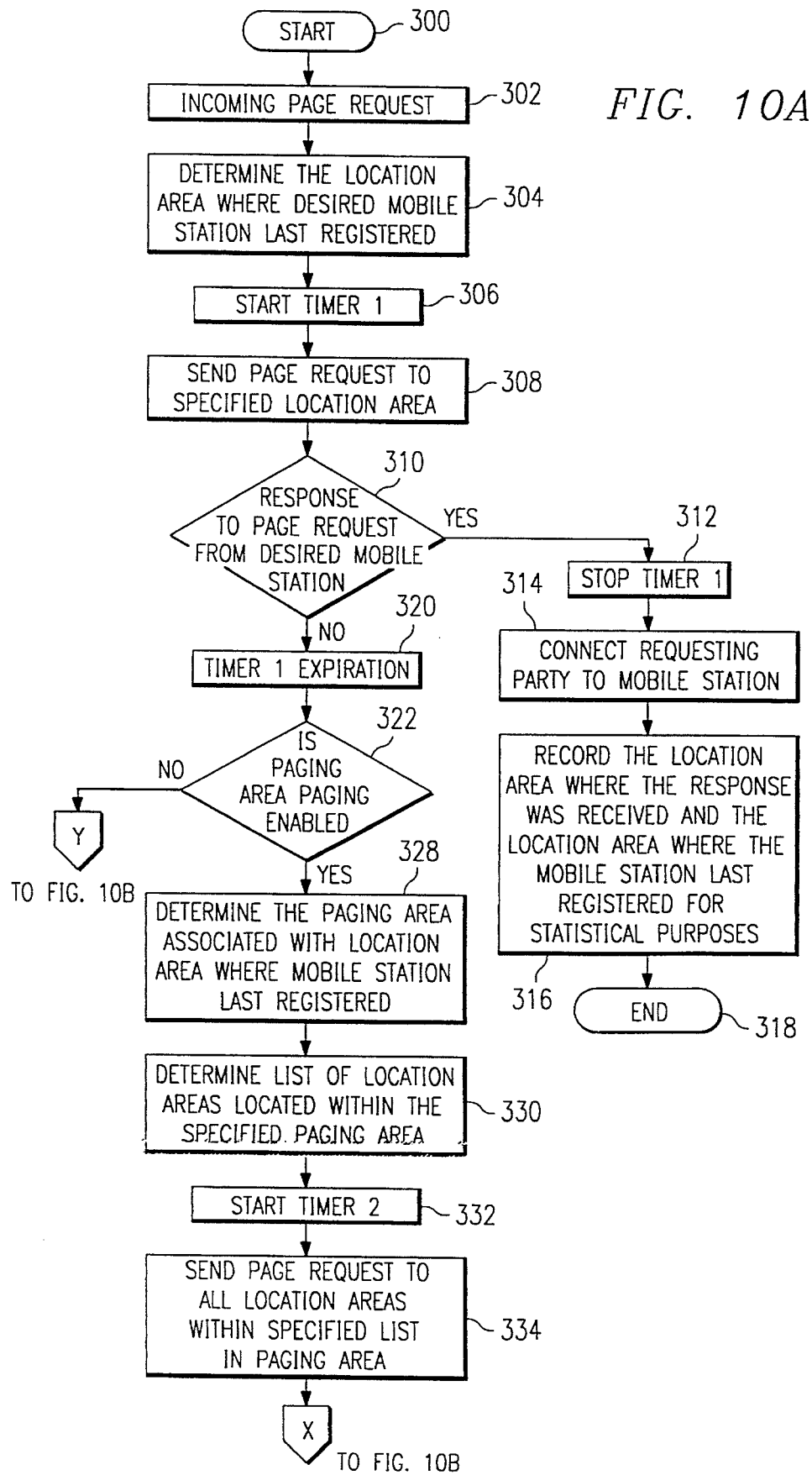

Referring next to the flow chart of FIG. 10A–10B, it is there illustrated how the system of the present invention implements a page request coming into the system. The procedure begins at 300, and at 302, an incoming page request is accepted into the system. Thereafter, at 304 the system recalls from its memory the location area from where the desired mobile station last registered. Next, at 306, a timer is started to establish how long one will wait for a response to a page request that will be transmitted to the specified location area where the mobile station last registered. At 308, the systems ends a page request to the specified location area where the mobile station last registered. The system then asks at 310 whether a page response has been received from the desired mobile station. If a page response has been received from the mobile station, the system proceeds to 312 where the timer is stopped. Next, at 314, the system connects the mobile station to the requesting calling party. Thereafter, at 316 the system records the identity of the location area from which the response was received and where the mobile station last registered for statistical purposes. These statistics will be utilized in further optimizing the coverage of the location areas and the paging areas. The paging process ends at 318.

If at 310, a page response is not received from the mobile station, the system proceeds to 320 where the timer expires. Next, at 322 the system asks whether paging area paging has been enabled. If paging area paging has not been enabled, the system proceeds to 338 where it is determined whether or not service area paging is enabled for the system. If service area paging has not been enabled, the system proceeds to 342 where the calling party is informed that the mobile station cannot be reached. The paging process then ends at 344.

If, at 322 it is determined that paging area paging has been enabled, the system proceeds to 328 where the system retrieves from its memory the paging area parameters associated with the location area where the mobile last registered. Next, at 330 the system retrieves the list of the particular location areas defined by the specified paging area parameters. Thereafter, at 332 a second timer is started to establish how long one will wait for a response to a page request which will be transmitted to the specified paging area. At 334, the system sends a page request to each of the location areas within the defined paging area. The system asks at 340 whether a page response has been received from the desired mobile station. If so, at 366 the second timer is stopped; thereafter, the system at 368 connects the calling party to the desired mobile station. At 370 the system records the location area from which a page response was received and where the mobile station last registered for statistical purposes. The paging process ends at 372.

If at 340, a page response is not received by the system from the desired mobile station the second timer will expire at 336. The system then asks at 338 whether service area paging has been enabled for the system. If service area paging has not been enabled the system proceeds to 342 where the calling party is informed that the mobile station cannot be reached. The paging process then ends at 344.

If at 338 service area paging has been enabled for the system, then, at 346, a third timer is started. Thereafter, at 348 the system sends page requests to all location areas within the system area. The system then asks at 350 whether a page response has been received from the desired mobile station. If yes, at 352, the third timer is stopped. Next, at 354 the calling party is connected to the desired mobile station; and, at 356 the system records the location area from which the response was received and where the mobile station last registered for statistical purposes. The paging process then ends at 358.

If, at 350 a page response is not received from the desired mobile station, at 360 the third timer will expire. Next, at 362 the system will inform the calling party that the mobile station cannot be reached. The paging process then end at 364.

In summary, the paging process optimizes the use of the control channel capacity by first sending a page request to the last known location of the desired mobile station. If no response is received within a specified time period, page requests are sent to a group of predetermined location areas, i.e. a paging area, which includes the location area where the desired mobile station last registered and a plurality of location areas wherein the mobile station would be statistically likely to be found if it had last registered within the previously paged location area. This paging area includes more than one location area and less than the total of all location areas within the system area. A paging area may also extend into and include location areas within a contiguous neighboring cellular system. If a response is still not received from the mobile station after the paging area page, then a service area page will be transmitted.

It should be noted that the statistical information gathered by the system relating the location area in which a mobile was actually located (based upon a response to either a paging area page or a service area page) to the location in which it last registered forms a basis for the grouping of location areas into paging areas. That is, the idiosyncratics of the geographic terrain and obstructions of a system will affect the reception of radio signals in different cells and location areas thereof and these statistical data enable an operator to configure both contiguous and overlapping paging areas to optimize the likelihood of locating the mobile while minimizing the load on the control channel capacity of the system.

As can be seen from the above description, the present invention enables page requests to be handled by a cellular system in a logical and orderly manner based upon the economic realities of system operation. It enables optimized use of system resources, such as control channel (FOCC) space allocation, and at the same time enables the system operation to be highly responsive to paging requests which merit such treatment.

It is believed that the operation and construction of the present invention will be apparent from the foregoing description. While the method and apparatus shown and described has been characterized as being preferred, obvious changes and modifications may be made therein without departing from the spirit and scope of the invention as defined in the following claims.

What is claimed is:

1. A method of paging mobile stations within a cellular telecommunications exchange comprising:

storing a set of own exchange page request group designations, paging extents and paging priority parameters for paging requests from uncooperating exchanges;

assigning to each page request received by said exchange a page request group designation based upon the characteristics of the page request, said characteristics of said page request including indications of a most probably location and an alternative location of the mobile station to which the page is directed;

assigning to each of said page requests received a paging extent designation to be associated with one or more page attempts and representing the geographic area within the exchange to which each page attempt is to be broadcast;

assigning to each page attempt in response to said page request a paying priority which is related to the page request group designation and the paging extent designation, of said page request;

retrieving said own exchange paging parameters in the event the page request is received from an uncooperating exchange causing the foregoing steps of assigning to fail; and executing each page attempt within said telecommunications exchange in a sequential order based upon its assigned paging priority.

2. A method of paging within a cellular telecommunication exchange as set forth in claim 1 in which said characteristics of said page request include indications of a source of said page request.

3. A method of paging within a cellular telecommunication exchange as set forth in claim 1 which includes the additional step of:

storing each of said page attempts within a buffer memory in sequential order in accordance with the paging priority assigned to said attempts.

4. A method of paging mobile stations within a cellular telecommunication exchange comprising:

selectively preassigning a set of page request group designations, paging extents and paging priority parameters to each of a plurality of cooperating exchanges from which said telecommunication exchange expects to receive page requests;

retrieving said preassigned paging priority parameters in response to identification of a page request as having been received from a particular cooperating exchange; otherwise:

assigning to each page request received by said exchange a page request group designation based upon the characteristics of the page request, said characteristics of said page request including indications of a most probable location and an alternative location of the mobile station to which the page is directed;

assigning to each of said page requests received a paging extent designation to be associated with one or more page attempts and representing the geographic area within the exchange to which each page attempt is to be broadcast; and assigning to each page attempt in response to said page request a paging priority which is related to the page request group designation and the paging extent designation, of said page request; and executing each page attempt within said telecommunications exchange in a sequential order based upon its assigned paging priority.

5. A method of paging within a cellular telecommunication exchange as set forth in claim 4 in which a set of default cooperating exchange page request group designations, paging extents and paging priority parameters are stored and which also includes:

retrieving said default paging priority parameters in response to a cooperating exchange the identity of which cannot be determined.

6. A method of paging within a cellular telecommunication exchange as set forth in claim 1 which includes the additional step of:

modifying the paging priorities assigned to each page attempt as a function of the priority of service of the mobile station to which the page request is directed.

7. A method of paging within a cellular telecommunication exchange as set forth in claim 6 in which:

said paging priorities are modified by increasing or decreasing the paging priority of each page attempt directed to a mobile station which subscribes to priority service.

8. A method of paging within a cellular telecommunication exchange as set forth in claim 1 in which:

each page request is assigned a paging extent containing a plurality of page attempts and each attempt is directed to either a location area, a paging area or a service area.

9. A method of paging within a cellular telecommunication exchange as set forth in claim 1 which also includes:

terminating the execution of page attempts in association with a particular page request in response to the receipt of a page response from the mobile station being paged.

10. A method of paging within a cellular telecommunication exchange as set forth in claim 4 in which said sets of page request group designations, paging extents and paging priority parameters are selectively preassigned to each of said plurality of cooperating exchanges based upon prior experience with the percentage of page responses received from mobile stations in response to page requests generated by said cooperating exchanges.

11. A system for paging mobile stations within a cellular telecommunications exchange comprising:

means for storing a set of own exchange page request group designation paging extents and paging priority parameters;

means for assigning to each page request received by said exchange a page request group designation based upon the characteristics of the page request, said characteristics of said page request including indications of a most probable location and an alternative location of the mobile station to which the page is directed;

means for assigning to each of said page requests received a paging extent designation to be associated with one or more page attempts and representing the geographic area within the exchange to which each page attempt is to be broadcast;

means for assigning to each page attempt in response to said page request a paging priority which is related to the page request group designation and the paging extent designation, of said page request;

means for retrieving said own exchange paging priority parameters in the event the page request is received from an uncooperating exchange and the plural means for assigning fail; and means for executing each page attempt within said telecommunications exchange in a sequential order based upon its assigned paging priority.

12. A system for paging within a cellular telecommunication exchange as set forth in claim 11 in which said characteristics of said page request include an indication of a source of said page request.

13. A system for paging within a cellular telecommunication exchange as set forth in claim 11 which also includes:

means for storing each of said page attempts within a buffer memory in sequential order in accordance with the paging priority assigned to said attempts.

14. A system for paging mobile stations within a cellular telecommunication exchange comprising:

means for selectively preassigning a set of page request group designations, paging extents and paging priority parameters to each of a plurality of cooperating exchanges from which said telecommunication exchange expects to receive page requests;

means for retrieving said preassigned paging priority parameters in response to identification of a page request as having been received from a particular cooperating exchange; otherwise:

means for assigning to each page request received by said exchange a page request group designation based upon the characteristics of the page request, said characteristics of said page request including indications of a most probably location and an alternative location of the mobile station to which the page is directed;

means for assigning to each of said page requests received a paging extent designation be associated with one or more page attempts and representing the geographic area within the exchange to which each page attempt is to be broadcasts; and means for assigning to each page attempt in response to said page request a paging priority which is related to the page request group designation and the paging extent designation, of said page request; and means for executing each page attempt within said telecommunications exchange in a sequential order based upon its assigned paging priority.

15. A system for paging within a cellular telecommunication exchange as set forth in claim 14 in which a set of default cooperating exchange page request group designations, paging extents and paging priority parameters are stored and which also includes:

means for retrieving said default paging priority parameters in response to a cooperating exchange the identity of which cannot be determined.

16. A system for paging within a cellular telecommunication exchange as set forth in claim 11 which also includes:

means for modifying the paging priorities assigned to each page attempt as a function of the priority of service of the mobile station to which the page request is directed.

17. A system for paging within a cellular telecommunication exchange as set forth in claim 16 in which:

said paging priorities are modified by increasing or decreasing the paging priority of each page attempt directed to a mobile station which subscribes to priority service.

18. A system for paging within a cellular telecommunication exchange as set forth in claim 11 in which:

each page request is assigned a paging extent containing a plurality of page attempts and each attempt is directed to either a location area, a paging area or a service area.

19. A system for paging within a cellular telecommunication exchange as set forth in claim 4 which also includes:

means for terminating the execution of page attempts in association with a particular page request in response to the receipt of a page response from the mobile station being paged.

20. A system for paging within a cellular telecommunication exchange as set forth in claim 14 in which said sets of page request group designations, paging extents and paging priority parameters are selectively preassigned to each of said plurality of cooperating exchanges based upon prior experience with the percentage of page responses received from mobile stations in response to page requests generated by said cooperating exchanges.

21. Within a cellular telecommunication exchange, a method for optimizing the allocation of control channel resources in the execution of paging attempts to mobile stations in response to page requests from at least one source, said method comprising the steps of:

classifying page requests into groups based upon the characteristics of each request, said classifying step further comprising:

analyzing the certainty with which the location of the mobile station sought in said page request is known; and obtaining an indication of the source of said page request;

assigning a value to various possible paging patterns based upon the relative costs of execution of said paging patterns wherein said paging patterns include the directing of page attempts into different geographic regions within said exchange comprising location areas paging areas and service areas wherein the more economically efficient ones of said paging patterns are given preference over the others when assigning said values;

assigning paging priorities to each of said page requests based upon its associated characteristics and the value of the requested paging pattern; and executing page attempts in response to each of said page requests in a sequential order according to said assigned priorities.

* * * * *

UNITED STATES PATENT AND TRADEMARK OFFICE
CERTIFICATE OF CORRECTION

PATENT NO. : 5,533,094
DATED : Jul. 2, 1996
INVENTOR(S) : Sanmugam

It is certified that error appears in the above-indentified patent and that said Letters Patent is hereby corrected as shown below:

| | |
|---|---|
| Column 4, line 49 | Replace "ultilzation" With --utilization-- |
| Column 12, line 14 | Replace "s ought" With --sought-- |
| Column 13, line 43 | Replace "systems ends" With --system sends-- |
| Column 15, line 24 | Replace "probably" With --probable-- |
| Column 15, line 34 | Replace "paying" With --paging-- |
| Column 17, line 40 | Replace "probably" With --probable-- |
| Column 17, line 46 | Replace "broadcasts" With --broadcast-- |

UNITED STATES PATENT AND TRADEMARK OFFICE
CERTIFICATE OF CORRECTION

PATENT NO. :   5,533,094
DATED      :   Jul. 2, 1996
INVENTOR(S) :  Sanmugam

It is certified that error appears in the above-indentified patent and that said Letters Patent is hereby corrected as shown below:

Column 18, line 19      Replace "claim 4"
                            With --claim 11--

Signed and Sealed this

Thirtieth Day of December, 1997

*Attest:*

BRUCE LEHMAN

*Attesting Officer*       *Commissioner of Patents and Trademarks*